(12) United States Patent
Boyd

(10) Patent No.: US 6,318,614 B1
(45) Date of Patent: Nov. 20, 2001

(54) CERAMIC WIRE FEED ROLLERS

(75) Inventor: Gary L. Boyd, Durango, CO (US)

(73) Assignee: Ceramic Engineering Consulting, Inc., Durango, CO (US)

( * ) Notice: Subject to any disclaimer, the term of this patent is extended or adjusted under 35 U.S.C. 154(b) by 0 days.

(21) Appl. No.: 09/585,835

(22) Filed: Jun. 1, 2000

Related U.S. Application Data

(60) Provisional application No. 60/136,813, filed on Jun. 1, 1999.

(51) Int. Cl.⁷ .............................. B65H 20/00; B21B 1/40; F16C 13/00
(52) U.S. Cl. ................................. 226/181; 492/30; 492/53
(58) Field of Search .................................... 226/181, 190, 226/193; 492/30, 53

(56) References Cited

U.S. PATENT DOCUMENTS

| | | | |
|---|---|---|---|
| 4,809,599 | * 3/1989 | Kawada et al. | 226/193 X |
| 4,839,949 | * 6/1989 | Sobue et al. | 492/53 |
| 5,321,792 | * 6/1994 | Schonherr et al. | 226/181 X |
| 5,398,858 | * 3/1995 | Dugan et al. | 226/190 |
| 5,521,355 | * 5/1996 | Lorentzen | 219/137.7 |
| 5,714,735 | * 2/1998 | Offer | 219/136 |
| 6,127,041 | * 10/2000 | Szostek et al. | 492/53 X |
| 6,142,409 | * 11/2000 | Stewart et al. | 226/193 X |

FOREIGN PATENT DOCUMENTS 5-254728 * 10/1993 (JP).

* cited by examiner

Primary Examiner—Michael R. Mansen
(74) Attorney, Agent, or Firm—Wolland & Knight LLP

(57) ABSTRACT

Wire feed rollers made of ceramic material which virtually eliminate wire feed roller wear enabling continuous wire feed to the welding tip without discernable weld wire slippage. Adjacent ceramic wire feed rollers are used in sets where one roller includes a groove on a side surface while the second roller has no grooves. The ceramic wire feed rollers require relatively light clamping (contact) loads to effectively feed the wire to the weld tip enabling decreased wire feed roller drive torque requirements and reduced wear to drive gears and support bearings.

14 Claims, 3 Drawing Sheets

FIG 1
PRIOR ART
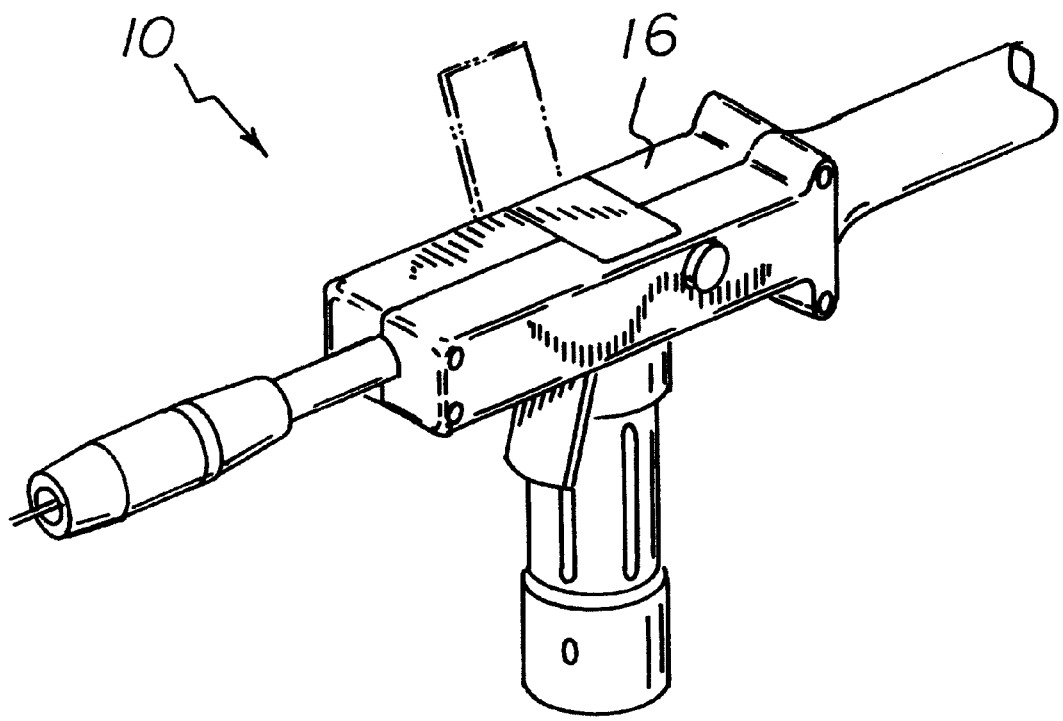
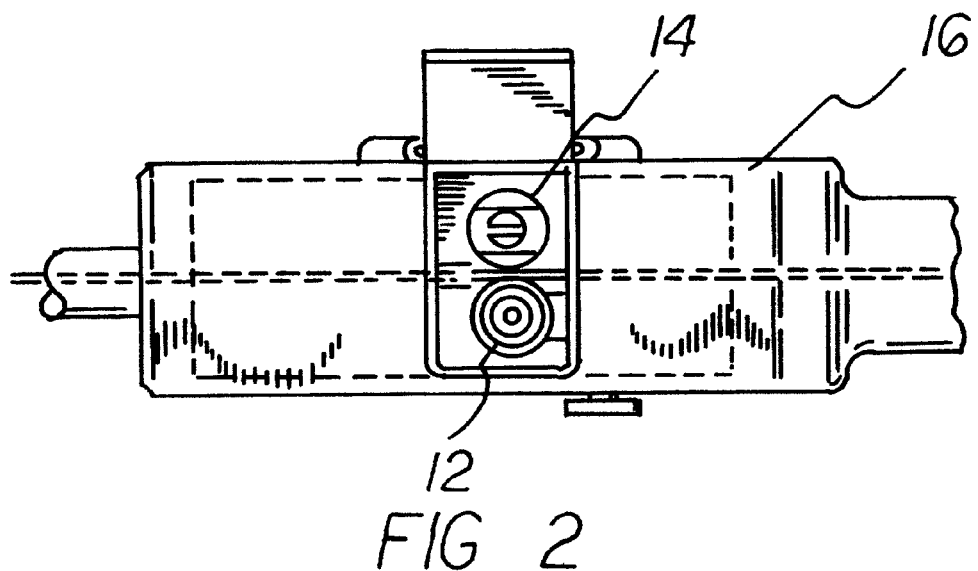
FIG 2

FIG 4
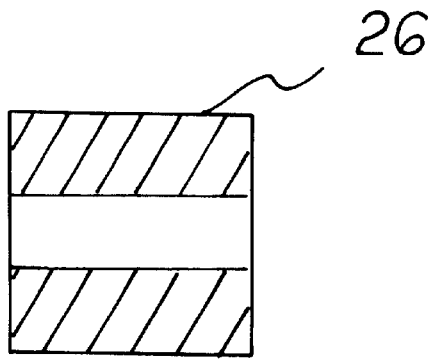
FIG 5
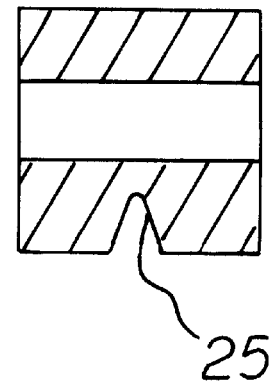
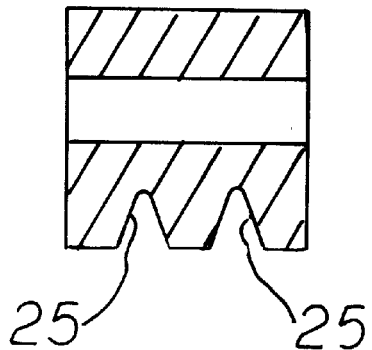
FIG 6

CERAMIC WIRE FEED ROLLERS

SPECIFIC DATA RELATED TO INVENTION

This application is a continuation-in-part of U.S. Provisional Application No. 60/136,813, filed Jun. 1, 1999 now abandoned.

BACKGROUND OF THE INVENTION

The present invention relates to welding equipment, and more specifically ceramic wire feeding rollers which possess a longer wear life than metallic wire feed rollers and which prohibit welding wire from slipping in a roller assembly.

A long recognized need in the wire feed roller industry, specifically with robotic MIG welders, is for wire feed rollers that do not wear out and allow the welding wire to slip in the roller assembly. To date, wire feed rollers are fabricated from various metallic materials which are life limited due to active wear mechanisms within the metallic materials. As the wire is fed through the rollers, high tangential shear stresses between the welding wire and the rollers results in material removal from the rollers. When a sufficient amount of material is removed, the clamping, or contact, load is reduced due to the increased clearances and the wire begins to slip in the rollers. Further, as the rollers wear, the contact surface becomes smooth effectively reducing the friction coefficient between the wire and the roller contact surface. If an increase in the clamping load is not made via tensioning adjustments, as found on many assemblies, the wire will fail to feed to the weld tip, thus causing an interrupted weld and entanglement, or balling, of the wire in the wire feed mechanism. This action results in costly equipment downtime and repair to interrupted weldments.

To enhance the functional life of metallic rollers, surface features are sometimes added to the contact surfaces to aid in gripping the wire. These surfaces too, are subject to wear through continuous welder usage which effectively eliminates any functional advantage. Since all metallic materials have active wear mechanisms (i.e., slip plane movement, dislocation movement, grain boundary movement, low relative compressive strength, low relative surface hardness, etc.), a specific high friction surface finish/feature cannot be maintained for extended usage periods.

It can be seen therefore that a need exists for wire feed rollers that possess significantly longer wear life than existing metallic rollers both to eliminate equipment downtime and to maintain continuous weld integrity. Further, reduced drive load requirements for wire feed roller drive motor assemblies and a sustainable clamping load regime that would not require regular tensioning adjustments to ensure welding wire slippage is minimized would be useful to the wire feed and welding equipment industries.

SUMMARY OF THE INVENTION

In view of the deficiencies of the existing conventional metallic wire feed rollers as a direct result of metallic material property limitations as stated herein, it is the objective of this invention to provide a unique wire feed roller design capable of being operated for periods greatly exceeding existing metallic wire feed roller technology thereby virtually eliminating wire feed roller equipment downtime and, in the case of robotic (or other) MIG welding equipment, interrupted weldments and high wire feed roller drive motor torque requirements.

An advantage of the present invention is that it provides a wire feed system of rollers that do not allow the feed wire to substantially slip while clamped together at relatively light contact loads. Further, since material wear mechanisms are not active in the candidate ceramic materials under the conditions typically seen in wire feed roller mechanisms, specially in robotic MIG welders, the ceramic rollers survive many times the life of metallic rollers under identical wire hardness and clamping load/feed scenarios. Another advantage of the present invention is the relatively light clamping, or contact, load requirements imposed on the wire feed rollers to enable continuous wire feed without substantial wire slippage in the contact region. These relatively light clamping loads results in reduced roller drive motor torque requirements which should effectively increase the operational life of the drive motor mechanisms. (i.e., electric drive motors, roller support bearings/bushings, etc.) Another advantage of the present invention is the light weight of the ceramic rollers when compared to state-of-the-art metallic rollers. Still another advantage of the present invention is the oxidation resistance of the ceramic roller material enabling indefinite storage without the need for oxidation resistant coatings or preservatives. Another advantage of the present invention is the ability of the ceramic wire feed roller to operate at elevated temperatures relative to state-of-the-art metallic rollers without adversely compromising roller form, fit, or function. Finally, another advantage exists should harder wire materials be required for some applications which would increase the wear rate of existing metallic materials but would not adversely affect the life or performance of the present invention. Prototype samples of this technology have been successfully fabricated and tested in actual field use equipment.

BRIEF DESCRIPTION OF THE DRAWINGS

FIG. 1 is a prior art drawing of a welding gun which includes a set of wire feed rollers inside.

FIG. 2 is an exploded top view of FIG. 1 where the wire feed rollers are viewable.

FIG. 4 illustrates a cross sectional view of a flat ceramic wire feed roller taken along view IV—IV.

FIG. 5 illustrates a cross sectional view of a single grooved wire feed roller taken along view V—V.

FIG. 6 illustrates a cross sectional view of a multi-grooved ceramic wire feed roller taken along view V—V.

DESCRIPTION OF THE INVENTION

Figure 3:
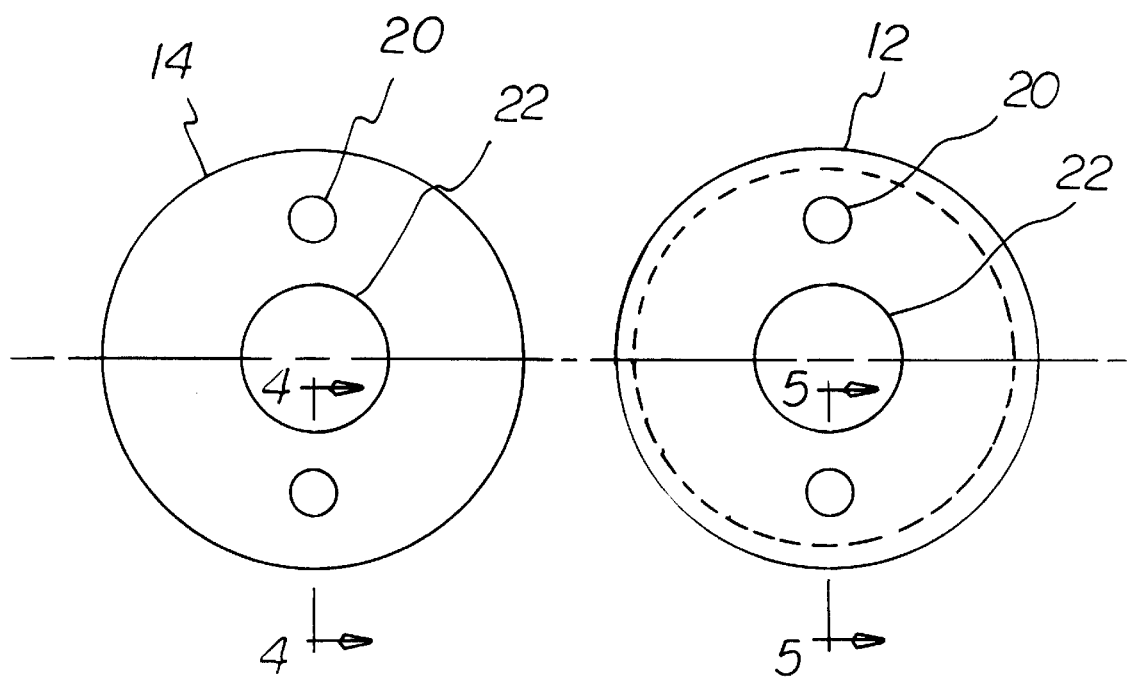
FIG. 3 illustrates a planer view of a grooved and flat ceramic wire feed rollers.

By way of example FIGS. 1 and 2 illustrate an exemplary prior art example of a welding gun 10 with a set of wire feed rollers 12, 14 located inside of a main housing unit 16. The wire feed rollers 12, 14 are made of a variety of metallic materials which are life limited due as a result of active wear mechanisms within the metallic materials. Even though FIGS. 1 and 2 illustrate only two wire feed rollers 12, 14 adjacent to each other, the present invention can be utilized with a plurality of wire feed rollers where each roller is adjacent to a second roller.

FIG. 3 illustrates a planer view of grooved and flat ceramic wire feed rollers. Each roller is circular in nature with a circular top and bottom portion and a side wall cylindrical in nature and fixed between the outer edges of the top and bottom portions. Anti-rotation pin holes 20 are located on the ceramic wire feed rollers 12, 14. A hole 22 is located in the center for holding the rollers placing the rollers within a welding apparatus. An example of the ceramic material used for the wire feed rollers 12, 14 is a co-valently bonded, multi-crystalline, fine grain ceramic material. Examples of these materials may include, but are not limited to, silicon nitride ($Si_3N_4$), zirconia ($ZrO_2$), and aluminum oxides ($Al_2O_3$). The rollers 12, 14 are designed such that a surface topography can be achieved and maintained virtually throughout the roller operation without significant contact surface degradation.

FIGS. 4, 5, and 6 illustrate cross sectional views of a grooved ceramic wire feed roller and a flat ceramic wire feed roller. To reduce contact surface degradation, one roller 12 is designed with an angular V-groove 25 while the adjacent roller 14 retains a flat 26 or un-grooved outside diameter surface. Additionally, the ceramic material has a surface finish/topography designed to maximize contact friction between the rollers and the wire which can be achieved via several ceramic primary and/or secondary processing methods. For example, a high friction surface topography can be achieved via green machining and densification to "as-fired" surfaces, or tumbling densified ceramic materials to remove brittle/lower density surface layers resulting from some densification processes, or simply machining, such as diamond grinding or other means of material removal, the contact surfaces to the desired surface finish.

Though a single groove 25 is illustrated in FIG. 4 and two grooves are illustrated in FIG. 6, a plurality of more grooves may be used and even though the present invention discloses V-shaped grooves, one skilled in the art will realize that other shaped grooves may also be utilized. The depth and width of the grooves may be varied depending upon the diameter of the wire to be fed through the ceramic wire feed rollers.

While the invention has been described in what is presently considered to be the preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A wire feed system for use with a welding apparatus to assist in feeding welding wire in the welding apparatus, the system comprising:

a first wire feed roller completely formed from a ceramic material, having a circular top and circular bottom of same diameter and a cylindrical wall with an outer surface, wherein said cylindrical side wall is disposed perpendicular to said top and bottom at the outer edges of said top and said bottom and having a groove imbedded in said outer surface of said cylindrical wall;

a second wire feed roller completely formed from a ceramic material, having a circular top and circular bottom of same diameter and a cylindrical side wall with an outer surface, wherein said cylindrical wall is disposed perpendicular to said top and bottom at the outer edges of said top and said bottom and having an un-grooved outer surface in said cylindrical side wall.

2. The wire feed system of claim 1 wherein said first ceramic wire feed roller has a plurality of grooves imbedded in said outer surface said cylindrical side wall.

3. The wire feed system of claim 1 wherein said groove is an angular V-shaped groove.

4. The wire feed system of claim 1 wherein said first ceramic wire feed roller is adjacent to said second ceramic wire feed roller.

5. The wire feed system of claim 4 wherein a plurality of first and second rollers are used within the welding apparatus.

6. The wire feed system of claim 1 wherein said ceramic material is a co-valently bonded, multi-crystalline, fine grain ceramic material.

7. The wire feed system of claim 1 wherein said cylindrical side wall has a high friction surface topography on said outer surface which maximizes contact friction between said first and said second rollers and said wire.

8. The wire feed system of claim 1 wherein a hole for an anti-rotation pin is displaced through said top and said bottom of said first and said second rollers.

9. The wire feed system of claim 1 wherein a hole for attaching said first roller and said second roller to the welding apparatus is displaced through said top and said bottom of said first and said second rollers.

10. A wire feed system for use in welding, the system comprising:

a welding gun having a main housing unit;

first and second wire feed rollers positioned adjacent one another within the main housing unit of the gun, the first and second feed rollers for use in contacting and transporting a length of wire, the first and second feed rollers having circular top and bottom surfaces and a cylindrical side wall that is disposed perpendicular to the top and bottom surfaces, each of the feed rollers being completely formed from a ceramic material.

11. The wire feed system as described in claim 10 wherein the first wire feed roller has a v-shaped groove embedded in it cylindrical sidewall.

12. The wire feed system as described in claim 10 wherein each of the rollers is completely formed from a co-valently bonded, multi-crystalline, fine grain ceramic material.

13. The wire feed system as described in claim 10 wherein the first wire feed roller includes a plurality of grooves embedded in its cylindrical sidewall.

14. The wire feed system as described in claim 10 wherein the first wire feed roller has a groove formed within the cylindrical sidewall.

* * * * *

UNITED STATES PATENT AND TRADEMARK OFFICE
CERTIFICATE OF CORRECTION

PATENT NO.    : 6,318,614 B1
DATED         : November 20, 2001
INVENTOR(S)   : Gary L. Boyd It is certified that error appears in the above-identified patent and that said Letters Patent is hereby corrected as shown below:

<u>Title page,</u>
Item [74], *Attorney, Agent or Firm*, "Wolland" should read -- Holland --.

<u>Column 3,</u>
Line 26, "FIG. 4" should read -- FIG. 5 --.

Signed and Sealed this

First Day of April, 2003

JAMES E. ROGAN
*Director of the United States Patent and Trademark Office*